United States Patent
Terada et al.

(10) Patent No.: US 9,507,337 B2
(45) Date of Patent: Nov. 29, 2016

(54) NUMERICAL CONTROL DEVICE

(75) Inventors: Koji Terada, Chiyoda-ku (JP);
Masakazu Sagasaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 410 days.

(21) Appl. No.: 14/351,367

(22) PCT Filed: Oct. 27, 2011

(86) PCT No.: PCT/JP2011/074825
§ 371 (c)(1),
(2), (4) Date: Apr. 11, 2014

(87) PCT Pub. No.: WO2013/061445
PCT Pub. Date: May 2, 2013

(65) Prior Publication Data
US 2014/0236340 A1    Aug. 21, 2014

(51) Int. Cl.
G06F 19/00 (2011.01)
G05B 19/18 (2006.01)
B23P 23/02 (2006.01)

(52) U.S. Cl.
CPC .............. *G05B 19/182* (2013.01); *B23P 23/02* (2013.01); *G05B 2219/49074* (2013.01)

(58) Field of Classification Search
CPC ......... B23B 1/00; B23B 3/065; B23Q 11/10; G05B 19/4093; G05B 19/4097; G05B 19/182; G05B 19/49074
See application file for complete search history.

(56) References Cited

U.S. PATENT DOCUMENTS

| 4,186,529 | A | * | 2/1980 | Huffman | ................ B23Q 11/10 |
| | | | | | 451/4 |
| 5,953,233 | A | * | 9/1999 | Higasayama | ...... G05B 19/4097 |
| | | | | | 318/573 |
| 2003/0023341 | A1 | * | 1/2003 | Sagawa | .............. G05B 19/4093 |
| | | | | | 700/159 |
| 2005/0217442 | A1 | * | 10/2005 | Akimoto | ................. B23B 3/065 |
| | | | | | 82/129 |
| 2008/0121078 | A1 | | 5/2008 | Kunimatsu et al. | |
| 2011/0167968 | A1 | * | 7/2011 | Akiyama | .................. B23B 1/00 |
| | | | | | 82/1.11 |

FOREIGN PATENT DOCUMENTS

| DE | 238868 A1 | 9/1986 |
| JP | 60-044239 A | 3/1985 |

(Continued)

OTHER PUBLICATIONS

International Search Report of PCT/JP2011/074825 dated Jan. 24, 2012.

*Primary Examiner* — Tuan Vu
(74) *Attorney, Agent, or Firm* — Sughrue Mion, PLLC; Richard C Turner

(57) ABSTRACT

To execute machining for a front surface while rotating a work and, at the same time, apply machining to an eccentric position on an end face, according to an embodiment of the present invention, an NC device includes an arc-superimposition-interpolation control unit configured to rotate a work rotating shaft based on a command of a base axis program for controlling rotation of the work rotating shaft while performing front surface machining using a first cutter holder and, at the same time, subject a second cutter holder to position control on a second machining route obtained by superimposing the rotation of the work rotating shaft on a first machining route based on a command of a superimposition axis program for performing position control for the second cutter holder.

6 Claims, 13 Drawing Sheets

(56) References Cited

FOREIGN PATENT DOCUMENTS

| | | |
|---|---|---|
| JP | 2000-117506 A | 4/2000 |
| JP | 2002-361528 A | 12/2002 |
| JP | 2003-195917 A | 7/2003 |
| JP | 2005-238379 A | 9/2005 |
| JP | 3830475 B2 | 10/2006 |
| JP | 2007-105820 A | 4/2007 |
| JP | 2008-126391 A | 6/2008 |
| JP | 2009-015464 A | 1/2009 |

* cited by examiner

FIG.10-1

PARAMETER A

| No. | NAME | CONTENT | C1 AXIS | X2 AXIS | Y2 AXIS |
|---|---|---|---|---|---|
| 201 | rapid | FAST FEEDING SPEED (mm/min) | 108000 | 32000 | 32000 |
| 202 | clamp | CUTTING SPEED (mm/min) | 36000 | 8000 | 8000 |

PARAMETER B

| No. | NAME | CONTENT | SETTING VALUE |
|---|---|---|---|
| 101 | Rmax | MAXIMUM MACHINING RADIUS (mm) | 20 |

FIG.10-2

| BASE AXIS | SUPER-IMPOSITION AXIS | SUPER-IMPOSITION AXIS SYNCHRONOUS MAXIMUM SPEED (mm/min) | SUPER-IMPOSITION AXIS FEED MAXIMUM SPEED (mm/min) | SUPER-IMPOSITION AXIS REAL AXIS MAXIMUM SPEED (mm/min) | BASE AXIS MAXIMUM SPEED DURING ARC SUPER-IMPOSITION (deg/min) | SUPER-IMPOSITION AXIS MAXIMUM SPEED DURING ARC SUPER-IMPOSITION (mm/min) |
|---|---|---|---|---|---|---|
| FAST FEED | STOP | BASE AXIS #201 rapid × π/180×Rmax (Rmax; MAXIMUM MACHINING DIAMETER) | 0 | MINIMUM VALUE OF #201 rapid OF SUPER-IMPOSED 2 AXES | BASE AXIS #201 rapid×Q Q IS CLAMP RATIO | 0 |
| FAST FEED | FAST FEED | | MINIMUM VALUE OF #201 rapid OF SUPER-IMPOSED 2 AXES | MINIMUM VALUE OF #201 rapid OF SUPER-IMPOSED 2 AXES | | MINIMUM VALUE×Q OF #201 rapid OF SUPER-IMPOSED 2 AXES |
| FAST FEED | CUTTING FEED | | MINIMUM VALUE OF #202 clamp OF SUPER-IMPOSED 2 AXES | MINIMUM VALUE OF #202 clamp OF SUPER-IMPOSED 2 AXES | | MINIMUM VALUE×Q OF #202 clamp OF SUPER-IMPOSED 2 AXES |
| CUTTING FEED | STOP | BASE AXIS #202 clamp × π/180×Rmax (Rmax; MAXIMUM MACHINING DIAMETER) | | MINIMUM VALUE OF #201 rapid, #202 clamp OF SUPER-IMPOSE 2 AXES | BASE AXIS #202 clamp ×Q | 0 |
| CUTTING FEED | FAST FEED | | MINIMUM VALUE OF #201 rapid, #202 clamp OF SUPER-IMPOSE 2 AXES | | | MINIMUM VALUE×Q OF #201 rapid, #202 clamp OF SUPER-IMPOSE 2 AXES |
| CUTTING FEED | CUTTING FEED | | | | | |

FIG.10-3

| BASE AXIS | SUPER-IMPOSITION AXIS | BASE AXIS MAXIMUM SPEED (deg/min) | SUPERIMPOSITION AXIS MAXIMUM SPEED (mm/min) |
|---|---|---|---|
| G0 | STOP | 91673 | 0 |
| | G0 | 49584 | 14691 |
| | G1 | 18906 | 1400 |
| G1 | STOP | 14003 | 0 |
| | G0 | 14003 | 3111 |
| | G1 | 14003 | 3111 |

NUMERICAL CONTROL DEVICE

FIELD

CROSS REFERENCE TO RELATED APPLICATIONS

This is a National Stage of International Application No. PCT/JP2011/074825 filed Oct. 27, 2011, the contents of which are incorporated herein by reference in its entirety.

The present invention relates to a numerical control device (hereinafter, NC device) that controls a machine tool for performing turning such as a lathe.

BACKGROUND

In recent years, concerning the machine tool, there is a demand that, to reduce a machining time, turning of the front surface (the outer peripheral surface) of a work and machining for an eccentric position on the side surface (the end face) of the work be simultaneously performed.

As a technology related to machining for the front surface and the end face of a work, Patent Literature 1 discloses a technology for applying various kinds of machining of a point, a straight line, a circle, a corner, a point group, and the like to the front surface (the outer peripheral surface) and the side surface (the end face) of work. These machining shapes are obtained by performing commanded two-dimensional path control on the end face by performing combination of work rotation and an X-axis one shaft. A point machining is performed by a drill, and a milling is performed by a milling tool.

Patent Literature 2 discloses a technology for simultaneously performing key grooving for the front surface and milling for the end face using a superimposition control.

Patent Literature 3 discloses a technology for simultaneously performing a machining for the front surface and a machining for the eccentric position of the end face in a comb teeth type automatic lathe capable of performing a Y-axis control.

Patent Literature 4 discloses a technology for applying a small-diameter circle machining having a center different from the center of a C shaft/spindle to the end face of a work by shifting a circular motion center of a cutter holder from the C shaft/spindle center while rotating the work.

CITATION LIST

Patent Literature

Patent Literature 1: Japanese Patent Application Laid-Open No. S60-044239
Patent Literature 2: Japanese Patent Application Laid-Open No. 2005-238379
Patent Literature 3: Japanese Patent Application Laid-Open No. 2000-117506
Patent Literature 4: Japanese Patent Application Laid-Open No. 2008-126391

SUMMARY

Technical Problem

However, according to the technology of Patent Literature 1, because only one cutter holder is present, it is impossible to perform the simultaneous machining for the front surface and the end face of the work.

According to the technology of Patent Literature 2, the key grooving in the longitudinal direction for the front surface and the milling for the end face are performed in a state in which the C shaft/spindle is stopped. Therefore, even if this technology is used, the turning or rotary machining for the front surface and the eccentric machining for the end face cannot be simultaneously executed.

According to the technology of Patent Literature 3, the eccentric machining for the front surface is executed during the time in which the C shaft/spindle is in a stopped state. If it is attempted to apply drilling to a position deviating from the rotation center during the C shaft/spindle rotation, a force in the lateral direction is applied to a drill bit and a drill is broken.

The technology of Patent Literature 4 is limited to the end face machining. Even if this technology is applied, the front surface machining and the end face machining cannot be simultaneously executed.

The present invention has been devised in view of the above and it is an object of the present invention to obtain a numerical control device that can execute machining for a front surface while rotating a work and, at the same time, apply machining to an eccentric position on an end face.

Solution to Problem

In order to solve the aforementioned problems, a numerical control device that controls a machine tool, which includes a work rotating shaft configured to rotate a work, a first cutter holder configured to machine a front surface of the work when the work is rotating; and a second cutter holder configured to be capable of moving on a surface having an axis direction of the work rotating shaft as a normal and machine the work from a side opposed to an end face of the work, according to one aspect of the present invention is configured to include: a machining-program storage region having stored therein a machining program including a first command for controlling the rotation of the work rotating shaft while performing front surface machining using the first cutter holder and a second command described using a relative coordinate to the work and for performing position control for the second cutter holder; and an arc-superimposition-interpolation control unit configured to rotate the work rotating shaft based on the first command and, at the same time, subject the second cutter holder to the position control on a second machining route obtained by superimposing the rotation of the work rotating shaft on a first machining route based on the second command.

Advantageous Effects of Invention

The numerical control device according to the present invention attains an effect that it is possible to execute machining for a front surface while rotating work and, at the same time, apply machining to an eccentric position on an end face.

BRIEF DESCRIPTION OF DRAWINGS

FIG. 1-2 is a diagram of the lathe viewed from an end face side of work.

FIG. 2 is a diagram for explaining a state in which grooving is applied to the end face of work according to arc superimposition interpolation.

FIG. 9-1 is a diagram of an example of a machining program in causing a superimposition axis to execute processing of G0 according to the arc superimposition interpolation.

FIG. 9-2 is a diagram of an example of a machining program in causing the superimposition axis to execute processing of G1 according to the arc superimposition interpolation.

FIG. 10-1 is a diagram for explaining parameters for calculating maximum speeds.

FIG. 10-2 is a diagram for explaining a calculation method for maximum speeds by a maximum-speed-by-operation-mode calculating unit.

FIG. 10-3 is a diagram for explaining a calculation result example of maximum speeds.

DESCRIPTION OF EMBODIMENTS

Embodiments of an NC device according to the present invention are explained in detail below based on the drawings. Note that the present invention is not limited by the embodiments.

First Embodiment.

Figure 1:
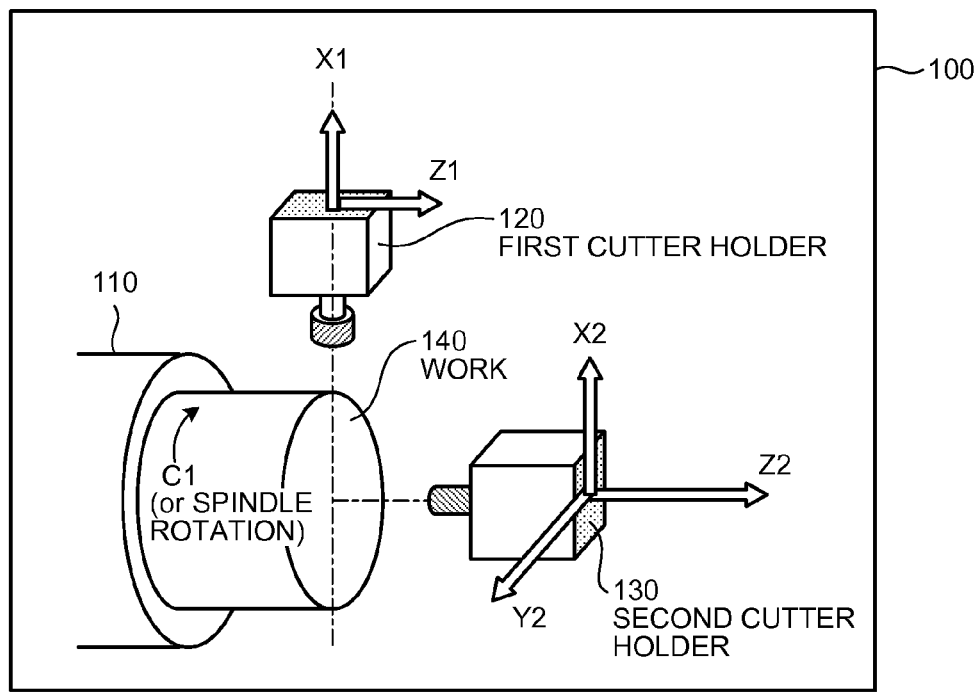
FIG. 1-1 is a diagram for explaining the main configuration of a lathe set as a control target by an NC device in an embodiment of the present invention.
Figures 1, 2:
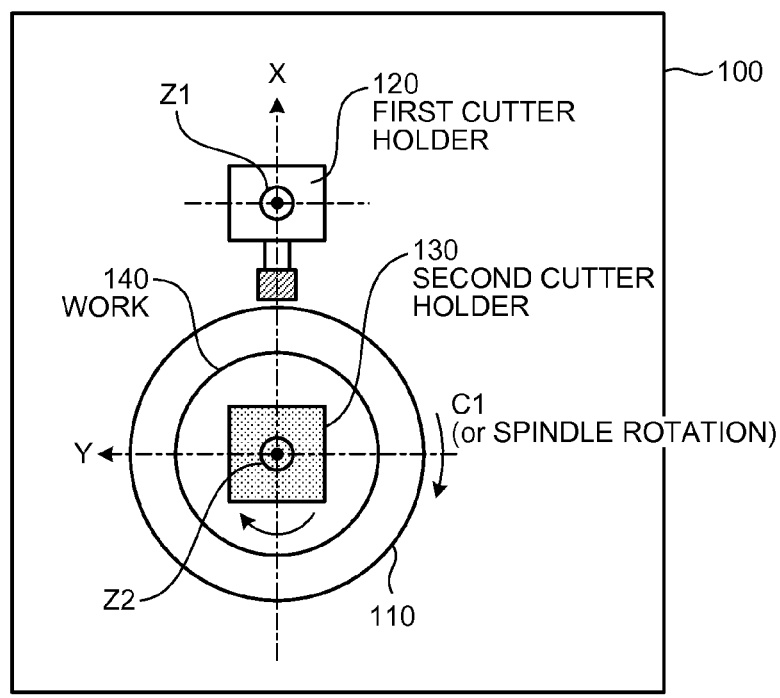
Figure 2:
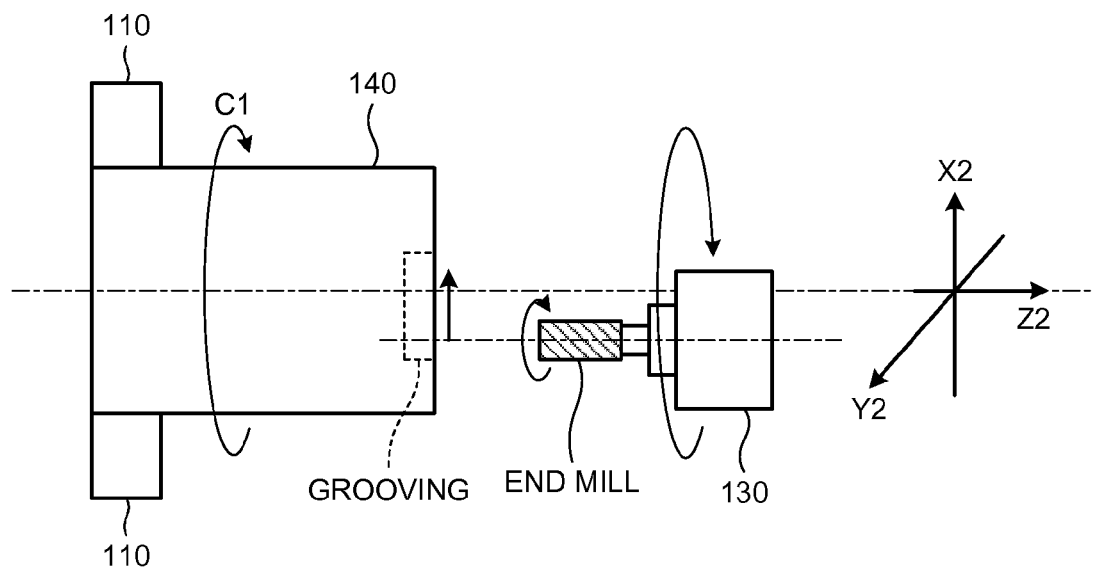

FIG. 1-1 is a diagram for explaining the main configuration of a lathe set as a control target by an NC device in an embodiment of the present invention. FIG. 1-2 is a diagram of the lathe viewed from an end face side of a work. As shown in FIG. 1-1 and FIG. 1-2, this lathe 100 includes a work holding tool 110 configured to rotate a work 140, a first cutter holder 120 controllable in at least an X (X1)-axis direction and a Z (Z1)-axis direction and capable of performing a front surface machining for the work 140 during the rotation of the work 140, and a second cutter holder 130 controllable in an X (X2)-axis direction, a Y (Y2)-axis direction, and a Z (Z2)-axis direction in a position opposed to the end face of the work and capable of applying machining to the end face of the work 140. The first cutter holder 120 and the second cutter holder 130 can each include a tool spindle for rotating a tool. Note that, in the following explanation, a shaft for rotating the work 140 is referred to as a work rotating shaft. The work rotating shaft is referred to as C (C1) shaft when the work 140 is driven under the position control and is referred to as a spindle when the work 140 is driven under the speed control.

Unlike the first cutter holder 120, the second cutter holder 130 can move on a surface having the work rotating shaft as the normal (a surface formed by the X2-axis and the Y2-axis) in a position opposed to the end face of the work 140. The NC device in the embodiment of the present invention can perform control for rotating the work 140 to perform machining of the front surface of the work 140 using the first cutter holder 120 and, at the same time, applying arbitrary machining using the second cutter holder 130 to an arbitrary position of the end face of the work 140. In the following explanation, this control is referred to as arc superimposition interpolation.

Examples of a type of the arbitrary machining include drilling, synchronous tapping, and milling. FIG. 2 is a diagram for explaining a state in which grooving is applied to the end face of the work 140 according to the arc superimposition interpolation. As shown in the figure, when the grooving is executed, an end mill is attached to the tool spindle of the second cutter holder 130. The second cutter holder 130 is, according to the arc superimposition interpolation, subjected to a position control to move on a route obtained by superimposing the rotation of the work 140 on a machining route of the end mill at the time when the rotation of the work 140 is stopped.

Figure 3:
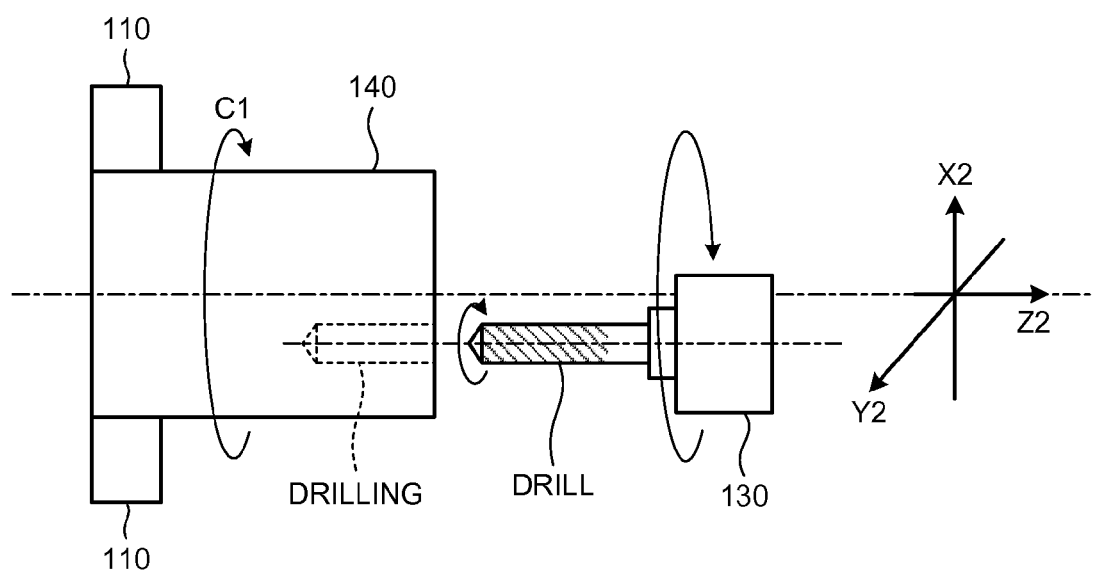
FIG. 3 is a diagram for explaining a state in which drilling is applied to the end face of the work according to the arc superimposition interpolation.

FIG. 3 is a diagram for explaining a state in which drilling is applied to the end face of the work 140 according to the arc superimposition interpolation. As shown in the figure, when the drilling is executed, a drill is attached to the tool spindle of the second cutter holder 130. The second cutter holder 130 is, according to the arc superimposition interpolation, subjected to a position control to move on a route obtained by superimposing the rotation of the work 140 on a drilling position at the time when the rotation of the work 140 is stopped.

Figure 4:
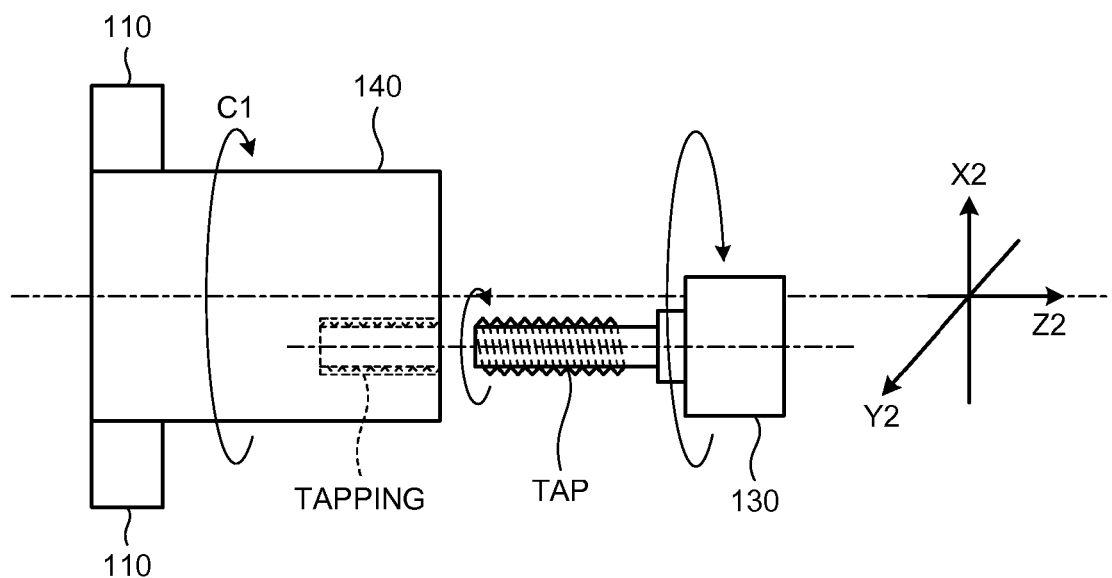
FIG. 4 is a diagram for explaining a state in which synchronous tapping is applied to the end face of the work according to the arc superimposition interpolation.

FIG. 4 is a diagram for explaining a state in which a synchronous tapping is applied to the end face of the work 140 according to the arc superimposition interpolation. As shown in the figure, when the synchronous tapping is performed, a tap is attached to the tool spindle of the second cutter holder 130. As in the case of the drilling in which the arc superimposition interpolation is applied, the second cutter holder 130 is, according to the arc superimposition interpolation, subjected to a position control to move on a route obtained by superimposing the rotation of the work 140 on a route for performing the synchronous tapping when the rotation of the work 140 is stopped.

Figure 5:
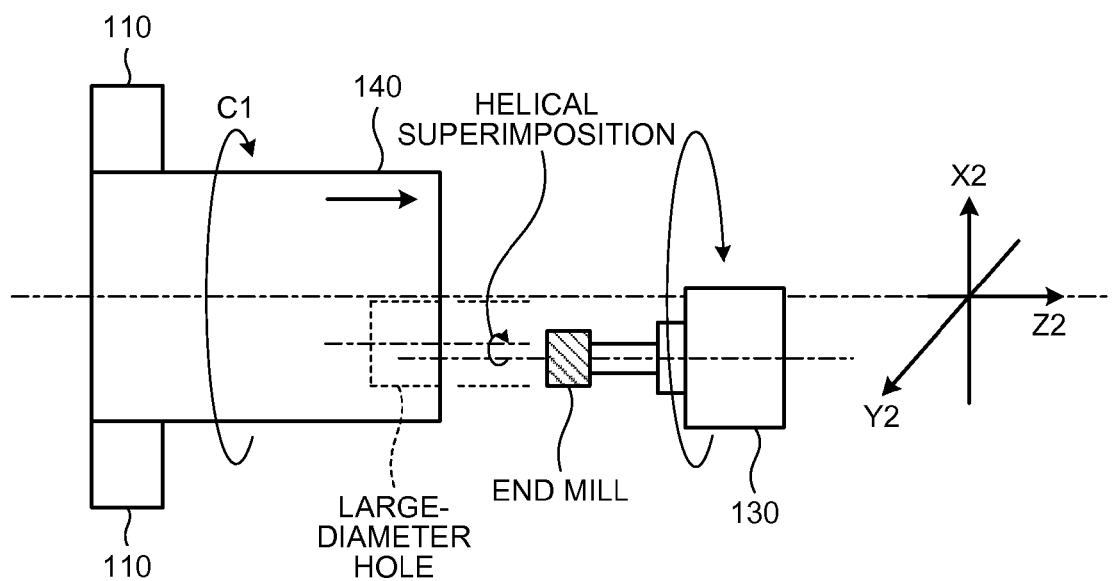
FIG. 5 is a diagram for explaining a state in which boring is applied to the end face of the work according to the arc superimposition interpolation.

FIG. 5 is a diagram for explaining a state in which a boring is applied to the end face of the work 140 according to the arc superimposition interpolation. As shown in the figure, when the boring is performed, the end mill is attached to the tool spindle of the second cutter holder 130. The second cutter holder 130 is, according to the arc superimposition interpolation, subjected to a position control to move on a route obtained by superimposing the rotation of the work 140 on a machining route of the end mill at the time when the rotation of the work 140 is stopped and the boring is performed. More specifically, according to the arc superimposition interpolation, the second cutter holder 130 is moved on a route obtained by superimposing the rotation of the work 140 on a route of the rotation of the end mill around an axis different from the tool spindle (so-called helical superimposition).

Figure 6:
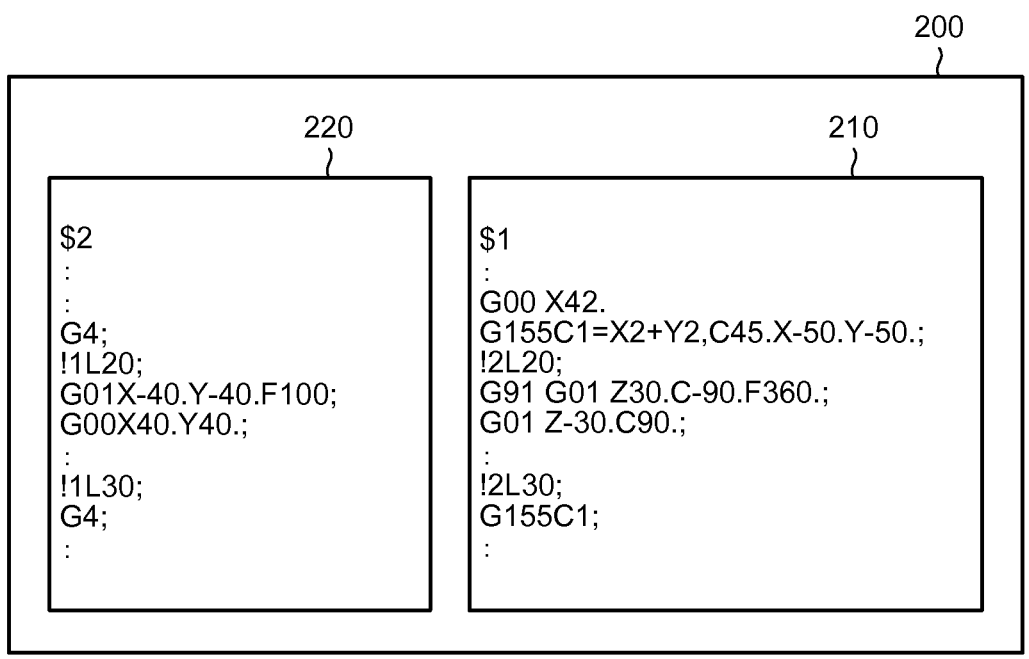
FIG. 6 is a diagram for explaining a machining program example in performing the arc superimposition interpolation.

FIG. 6 is a diagram for explaining a machining program example in performing the arc superimposition interpolation. A machining program 200 shown in FIG. 6 is a program for applying linear grooving to the end face of the work 140 using the second cutter holder 130 during the front surface machining involving the rotation of the work 140 by the first cutter holder 120. The machining program 200 includes a program for controlling the first cutter holder 120 and the rotation of the work 140 (a base axis program 210) and a program for controlling the second cutter holder 130 (a superimposition axis program 220). A controlled system having a first axis as the X1 axis, a second axis as the Z1 axis, and a third axis as the C1 axis is referred to as a base axis. A controlled system having a first axis as the X2 axis, a second axis as the Y2 axis, and a third axis as the Z2 axis is referred to as superimposition axis.

The superimposition axis program 220 is described using a relative coordinate to the work 140 in a stationary state. According to the machining program 200, position control for the X2 axis and the Y2 axis is performed and cutting in the Z2-axis direction is performed such that the second cutter holder 130 moves on a second machining route obtained by superimposing a machining route (a first machining route) on the relative coordinate on the end face of the work 140 designated by the superimposition axis program 220 on the rotation of the work 140 by the base axis program 210.

The arc superimposition interpolation is started by executing an arc superimposition interpolation command. The arc superimposition interpolation command is formed by a description "G155 'third axis name of base axis'='first axis name of superimposition axis'+'second axis name of superimposition axis'". The arc superimposition interpolation is ended by executing an arc superimposition interpolation cancel command. That is, in the example shown in FIG. 6, "G155C1=X2+Y2" corresponds to the arc superimposition interpolation command and "G155C1" corresponds to the arc superimposition interpolation cancel command.

According to the arc superimposition interpolation command, a start position of superimposed machining can be designated by adding a description ",CθXxaYya" following the description "G155C1=X2+Y2". The description ",CθXxaYya" means that the superimposed machining is started at a point when θ of the reference base axis reaches the position of XxaYya of the superimposition axis. That is, for example, "G155C1=X2+Y2, C45. X-50. Y-50." means a command for causing a tool of the second cutter holder 130 positioned in a position of X-50 Y-50 in advance to machine a desired track while performing a circular motion according to the rotation of the work 140 simultaneously with passing of a line of θ (45 degrees) of the work 140. According to the description designating the start position, a correspondence relation between a coordinate system of the work rotating shaft and a relative coordinate system used in the superimposition axis program 220 is established.

The NC device in this embodiment reads the base axis program 210 and the superimposition axis program 220 in parallel. After shifting to an arc superimposition mode according to the arc superimposition interpolation command described in the base axis program 210, the NC device in this embodiment synchronizes, according to "!2L20" described after the arc superimposition interpolation command in the base axis program 210 and "!1L20" described in the superimposition axis program 220, the execution timings of commands described after the respective descriptions. That is, the NC device in this embodiment starts execution of command "G91 G01 Z30. C-90. F360." and, at the same time, starts execution of a command "G01X-40. Y-40. F100". At this point, as explained above, the NC device in this embodiment superimposes the command "G01X-40. Y-40. F100" on the command "G91 G01 Z30. C-90. F360." and executes the command. Note that, when the command "G01X-40. Y-40. F100" is completed before the command "G91 G01 Z30. C-90. F360." is completed, the NC device superimposes the next command "G00X40. Y40." of the command "G01X-40. Y-40. F100" on the command "G91 G01 Z30. C-90. F360." and executes the command simultaneously with the command "G91 G01 Z30. C-90. F360.".

Figure 7:
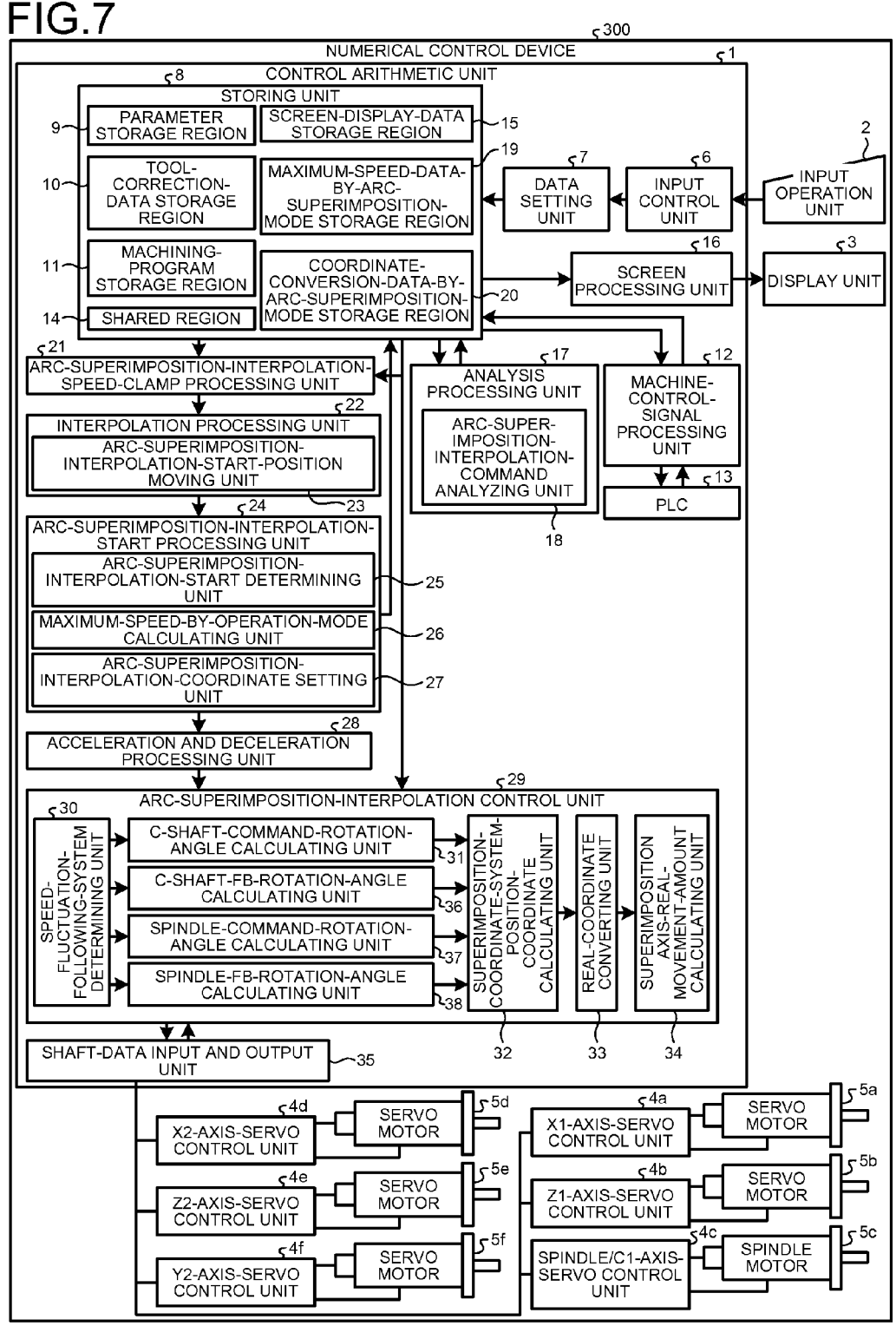
FIG. 7 is a diagram for explaining the configuration of an NC device in a first embodiment of the present invention.

FIG. 7 is a diagram for explaining the configuration of an NC device in a first embodiment of the present invention. As shown in the figure, an NC device 300 includes a control arithmetic unit 1, an input operation unit 2 configured to receive an operation input to the NC device 300 by an operator, a display unit 3 configured to display and output a control state of the NC device 300 to the operator, servo motors 5a to 5f configured to respectively drive axes (C1, X1, Z1, X2, Y2, and Z2) included in the lathe 100, and servo control units 4a to 4f each configured to supply electric current for driving the servo motors 5a to 5f. The control arithmetic unit 1 analyzes a machining program and a moving operation command input from the operator via the input operation unit 2, generates servo driving information, and outputs the generated servo driving information to the servo control units 4a to 4f. The servo control units 4a to 4f generate, based on the input servo driving information, electric currents for driving the servo motors 5a to 5f and supply the generated electric currents to the servo motors 5a to 5f. Note that, as the servo driving information, as an example, a movement amount at every control cycle is adopted.

The control arithmetic unit 1 includes an input control unit 6, a data setting unit 7, a storing unit 8, a machine-control-signal processing unit 12, a programmable controller (PLC) 13, a screen processing unit 16, an analysis processing unit 17, an arc-superimposition-interpolation-speed-clamp processing unit 21, an interpolation processing unit 22, an arc-superimposition-interpolation-start processing unit 24, an acceleration and deceleration processing unit 28, an arc-superimposition-interpolation control unit 29, and a shaft-data input and output unit 35.

Note that, typically, the control arithmetic unit 1 is realized by a computer including a CPU (Central Processing Unit), a ROM (Read Only Memory), a RAM (Random Access Memory), and an I/O interface. Specifically, for example, the CPU executes a numerical control program stored in the ROM in advance to thereby function as the data setting unit 7, the machine-control-signal processing unit 12, the programmable controller (PLC) 13, the screen processing unit 16, the analysis processing unit 17, the arc-superimposition-interpolation-speed-clamp processing unit 21, the interpolation processing unit 22, the arc-superimposition-interpolation-start processing unit 24, the acceleration and deceleration processing unit 28, and the arc-superimposition-interpolation control unit 29. The storing unit 8 is secured in the ROM or the RAM. An I/O interface realizes the functions of the input control unit 6 and the shaft-data input and output unit 35. Note that, typically, the control arithmetic unit 1 can realize a part or all of functional units, which are listed as being realized on the CPU, according to hardware or a combination of the hardware and software (a numerical control program).

Data input to the control arithmetic unit 1 from the input operation unit 2 is input to the data setting unit 7 via the input control unit 6, which is an input interface. The data setting unit 7 distributes and stores, based on an input mode selected in the input operation unit 2, the input data in a parameter storage region 9, a tool-correction-data storage region 10, and a machining-program storage region 11 respectively secured in the storing unit 8. The machining program 200 is stored in the machining-program storage region 11.

Note that, for the purpose of danger prevention or the like, peripheral devices (not shown in the figure) such as a relay, an electromagnetic valve, and a display lamp are connected to the lathe 100. Control of the peripheral devices is executed in cooperation with control of a machining mechanism for the work 140. Information for coordinating the control of the peripheral devices with the control of the machining mechanism for the work 140 is input to and output from the PLC 13 via the machine-control-signal processing unit 12. The PLC 13 executes the control of the peripheral devices based on the information input via the machine-control-signal processing unit 12 and a control program incorporated in the inside of the PLC 13 in advance.

The control of the PLC 13, execution processing of the machining program 200, and steady processing related to the NC device 300 are performed by storing intermediate information in a shared region 14 or referring to the intermediate information. The information for coordinating the control of the peripheral devices with the control of the machining mechanism for the work 140 is stored in the shared region 14.

A display content to be displayed corresponding to a display request input via the input operation unit 2 is shaped for display and stored in a screen-display-data storage region 15. The screen processing unit 16 transfers data stored in the screen-display-data storage region 15 to the display unit 3 to thereby cause the display unit 3 to display the display content.

The analysis processing unit 17 sequentially reads and analyzes the machining program 200 stored in the machining-program storage region 11 and extracts, from a read program block, a movement amount from the present position to a commanded position and designated feeding speed. The movement amount and the feeding speed extracted from the superimposition axis program 220 are respectively described in coordinate systems before superimposition. The extracted movement amount and the extracted movement amount are input to the arc-superimposition-interpolation-speed-clamp processing unit 21 via the shared region 14. When the analysis processing unit 17 detects a description "G155" in the machining program 200, the analysis processing unit 17 inputs a program block including the description "G155" to the arc-superimposition-interpolation-command analyzing unit 18.

Note that, when the work rotating shaft is controlled as the spindle and the speed of the work rotating shaft is given by a rotational frequency (commanded rotational frequency), the analysis processing unit 17 extracts the commanded rotational frequency of the work rotating shaft instead of the movement amount and the feeding speed related to the work rotating shaft and inputs the extracted commanded rotational frequency to the arc-superimposition-interpolation control unit 29.

The arc-superimposition-interpolation-command analyzing unit 18 extracts, from the input program block, the description ",CθXxaYya" related to a start position of an arc superimposition interpolation command and definition information (shaft number information, polarity information, etc.) of the base axis and the superimposition axis as information necessary for causing the second cutter holder 130 to perform coordinate rotation that synchronizes with the rotation of the work rotating shaft. The arc-superimposition-interpolation-command analyzing unit 18 stores the extracted contents in a coordinate-conversion-data-by-arc-superimposition-mode storage region 20 in the storing unit 8 as coordinate conversion data. Note that flags (FGs) of "superimposition axis start position designated" and "base axis start position designated" can be defined in the coordinate-conversion-data-by-arc-superimposition-mode storage region 20. The arc-superimposition-interpolation-command analyzing unit 18 can turn on and off the flags based on description content of ",CθXxaYya". When the description ",CθXxaYya" is absent after the description "G155C1=X2+Y2", the arc-superimposition-interpolation-command analyzing unit 18 can set the present position of C=0deg, XY as the start position.

Note that the coordinate conversion data includes a vector of the ordinate and the abscissa of the present position from the center of the work 140 besides the start position of the arc superimposition interpolation and the definition information of the axes. The vector is described (set) in the coordinate conversion data by an arc-superimposition-interpolation-coordinate setting unit 27 explained below.

The arc-superimposition-interpolation-speed-clamp processing unit 21 applies speed clamp to each of feeding speed of the first cutter holder 120 and feeding speed before superimposition of the second cutter holder 130 extracted by the analysis processing unit 17 such that each of the feeding speed of the first cutter holder 120 and feeding speed after superimposition of the second cutter holder 130 is equal to or lower than maximum allowable speed given by a parameter. The arc-superimposition-interpolation-speed-clamp processing unit 21 inputs the feeding speeds subjected to the speed clamp and the movement amount extracted by the analysis processing unit 17 to the interpolation processing unit 22.

Before executing the arc superimposition mode, a maximum-speed-by-operation-mode calculating unit 26 calculates maximum speed allowed for the feeding speed before superimposition of the second cutter holder 130 in advance for each of operation modes (combinations of stop, positioning, and cutting of the cutter holders) such that the feeding speed after superimposition of the second cutter holder 130 is equal to or lower than the maximum allowable speed. The maximum-speed-by-operation-mode calculating unit 26 stores the calculated maximum speed in a maximum-speed-data-by-arc-superimposition-mode storage region 19. A function of the maximum-speed-by-operation-mode calculating unit 26 is explained in detail below. The arc-superimposition-interpolation-speed-clamp processing unit 21 clamps speed data before superimposition with the maximum speed stored in the maximum-speed-data-by-arc-superimposition-mode storage region 19.

The interpolation processing unit 22 functions as a relative-coordinate-speed calculating unit configured to calculate, in cooperation with an acceleration and deceleration processing unit 28 explained below, based on a command described in the superimposition axis program 220, a movement amount at every control cycle in a relative coordinate with respect to the stationary work 140.

Specifically, the interpolation processing unit 22 subjects the movement amount to rough interpolation based on the input movement amount and the input feeding speed to thereby calculate a movement amount at every control cycle. The rough interpolation means that the movement amount is simply divided at the number of control cycles corresponding to the feeding speed.

To execute positioning control from the present position of the tool of the second cutter holder 130 to the start position of the arc superimposition interpolation designated on the end face of the work 140, an arc-superimposition-interpolation-start-position moving unit 23 present in the interpolation processing unit 22 generates a movement amount at every control cycle from the present position of the tool of the second cutter holder 130 to the start position of the arc superimposition interpolation.

The arc-superimposition-interpolation-start processing unit 24 performs preparation when starting the arc superimposition interpolation and the start of the arc superimposition interpolation. The arc-superimposition-interpolation-start processing unit 24 includes an arc-superimposition-interpolation-start determining unit 25, the maximum-speed-by-operation-mode calculating unit 26, and an arc-superimposition-interpolation-coordinate setting unit 27.

The arc-superimposition-interpolation-start determining unit 25 determines whether meeting of the base axis and the superimposition axis is completed. When the meeting of the base axis and the superimposition axis is completed, the arc-superimposition-interpolation-start determining unit 25 permits the start of control related to the arc superimposition interpolation.

Figure 8:
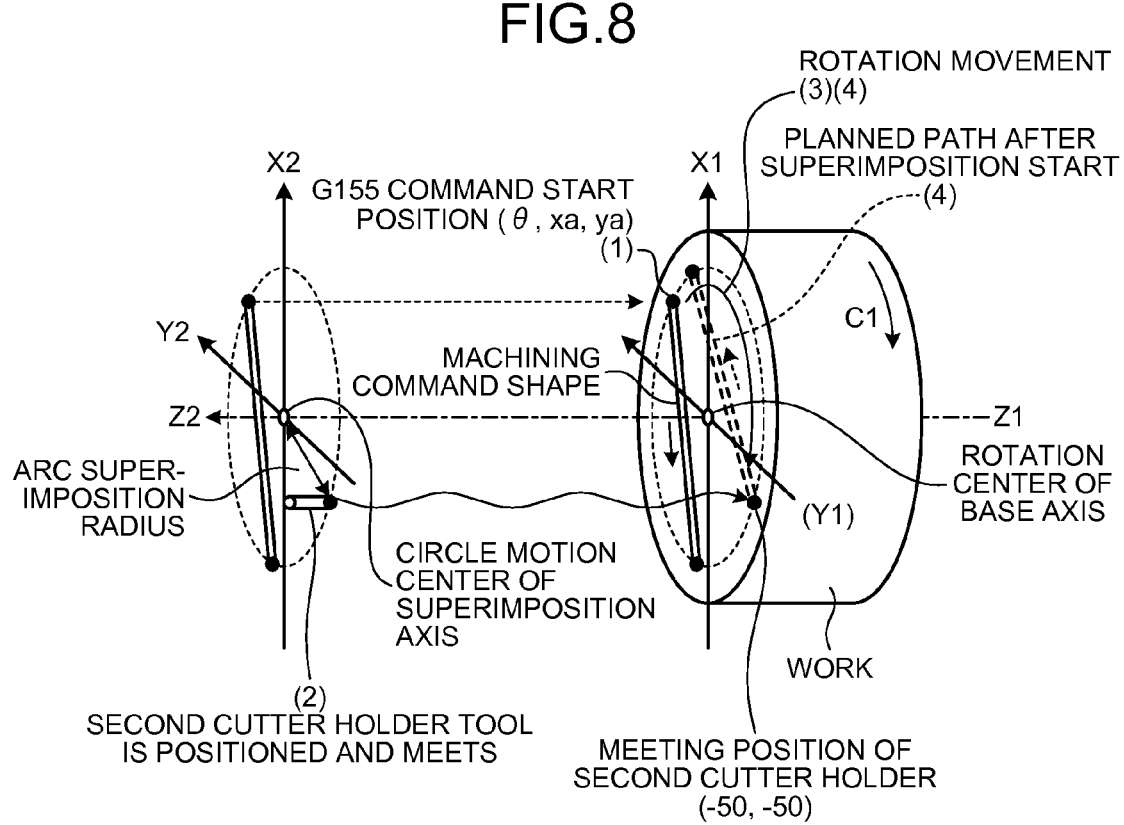
FIG. 8 is a diagram for explaining a start position of the arc superimposition interpolation.

FIG. 8 is a diagram for explaining the start position of the arc superimposition interpolation by the machining program 200 shown in FIG. 6. As shown in the base axis program 210 in FIG. 6, when a start position (X-50 Y-50) of the second cutter holder 130 and an angle (45 deg.) of the C shaft are designated by an arc superimposition start command, the shafts are driven according to a movement amount at every control cycle generated by the arc-superimposition-interpolation-start-position moving unit 23, whereby the tool of the second cutter holder 130, which is the superimposition axis, is moved from an initial position (a standby position) toward a rotation center (X0Y0Z0) of the superimposition axis. Finally, the tool of the second cutter holder 130 is stopped in a position where a rotation radius of the tool of the second cutter holder 130 around the rotation center of the superimposition axis is equal to a rotation radius of the designated start position X-50 Y-50. Note that the stop position is referred to as a position corresponding to the start position. The arc-superimposition-interpolation-start determining unit 25 determines whether the rotation angle (45 deg) of the rotating work 140 coincides with an angle of a vector starting in the rotation center of the superimposition axis and ending in the position corresponding to the start position. In other words, the arc-superimposition-interpolation-start determining unit 25 determines whether the position corresponding to the designated start position and the position of the work rotating shaft coincide with each other. After the angles coincide with each other, the arc-superimposition-interpolation-start determining unit 25 permits the start of the control related to the arc superimposition interpolation. That is, the control arithmetic unit 1 can shift to the arc superimposition mode and allow the tool of the second cutter holder 130 to cut in the Z-axis direction.

Note that, as a technology for designating the start position of the arc superimposition interpolation, there are various methods such as a method of automatically storing the angle, the position of the second cutter holder 130, and execution positions of an XY coordinate value command and an arc superimposition interpolation command. However, the arc superimposition interpolation start determination is necessary when the superimposed machining is started during the work rotation as explained above. The arc superimposition interpolation start determination is unnecessary when the second cutter holder 130 is positioned in a designated position during the time in which the work is stopped and machining by the second cutter holder 130 is started simultaneously with machining by the first cutter holder 120.

The maximum-speed-by-operation-mode calculating unit 26 calculates maximum speed allowed for the feeding speed before superimposition as a clamp value for the arc-superimposition-interpolation-speed-clamp processing unit 21 to apply speed clamp to the feeding speed before superimposition. The maximum-speed-by-operation-mode calculating unit 26 stores the calculated maximum speed in the maximum-speed-data-by-arc-superimposition-mode storage region 19. The maximum speed is calculated using a maximum machining radius of the work 140 and maximum allowable speeds during fast feed (G0) and cutting feed (G1) set for each of the work rotating shaft, the X2 axis, and the Y2 axis such that each of the work rotating shaft, the X2 axis, and the Y2 axis does not exceed the maximum allowable speed. The maximum speed is calculated for each of the base axis and the superimposition axis for each of combinations (operation modes) of operations (G0, G1) of the base axis and operations (stop, G0, G1) of the superimposition axis. Note that an input method for the maximum machining radius is not limited to a specific method. For example, the maximum machining radius can be set from the outside as a parameter stored in the parameter storage region 9 or can be described in the machining program 200 and input.

Figures 1, 9:
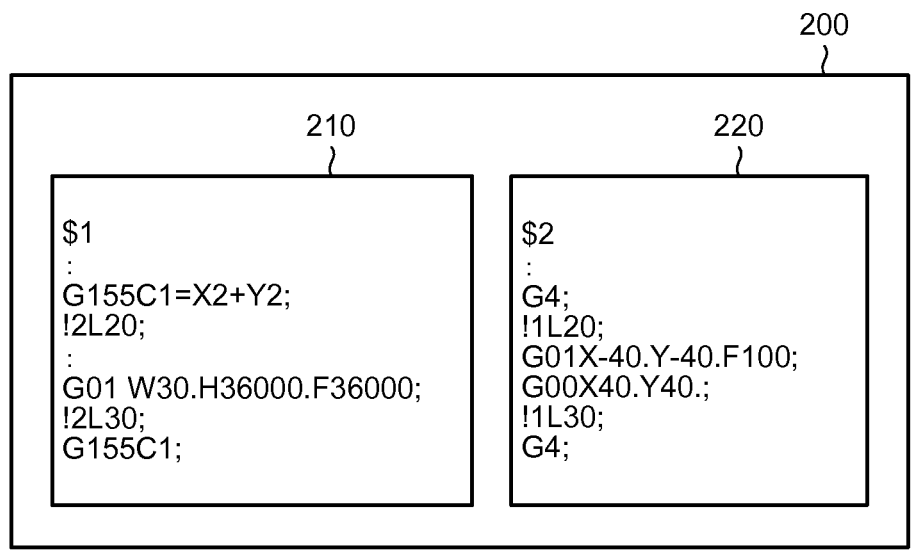
Figures 2, 9:
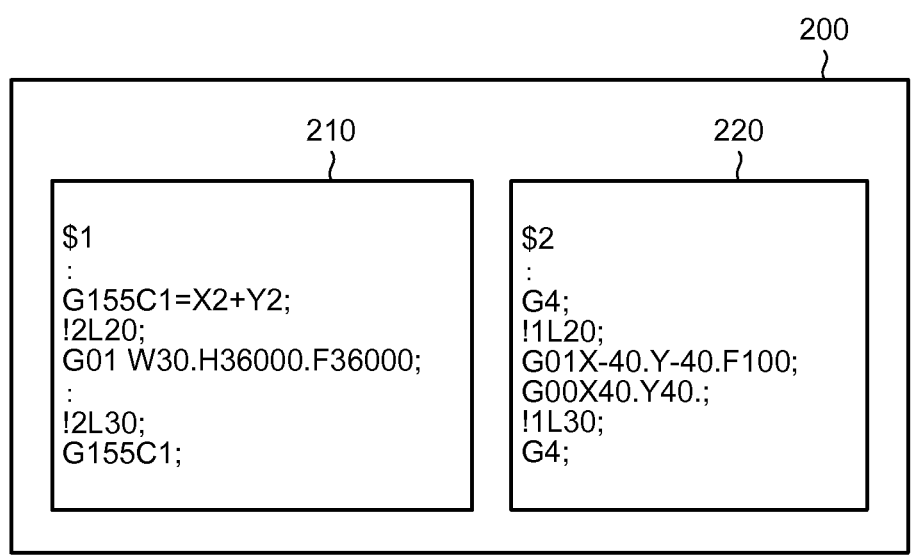

FIG. 9-1 is a diagram of an example of the machining program 200 in causing the superimposition axis to execute processing of G0 according to the arc superimposition interpolation. FIG. 9-2 is a diagram of an example of the machining program 200 in causing the superimposition axis to execute processing of G1 according to the arc superimposition interpolation. According to the machining program 200 shown in FIG. 9-1, a command for causing the superimposition axis to execute the fast feed at speed of 100 mm/min to the position of X-40 Y-40 is superimposed on the rotation of the base axis. According to the machining program 200 shown in FIG. 9-2, a command for causing the superimposition axis to execute the cutting feed at speed of 100 mm/min to the position of X-40 Y-40 is superimposed on the rotation of the base axis.

A calculation method for maximum speeds by the maximum-speed-by-operation-mode calculating unit 26 is explained with reference to FIG. 10-1 to FIG. 10-3. FIG. 10-1 is a diagram for explaining parameters stored in the parameter storage region for the calculation of maximum speed. As shown in FIG. 10-1, in the parameter storage region 9, a parameter A in which maximum allowable speeds during the fast feed and during the cutting feed are described and a parameter B in which a maximum machining radius of the work 140 is described are stored for each of the C1 axis, the X2 axis, and the Y2 axis.

First, the maximum-speed-by-operation-mode calculating unit 26 calculates each of superimposition axis synchronous maximum speed, superimposition axis feed maximum speed, and superimposition axis real axis maximum speed. Then, the maximum-speed-by-operation-mode calculating unit 26 substitutes the calculated information in the following formula and calculates a clamp ratio:

Clamp ratio=superimposition axis real axis maximum speed/(superimposition axis synchronous maximum speed+superimposition axis feed maximum speed)     Formula 1

First, a method of calculating, for each of commands for the superimposition axis, superimposition axis synchronous maximum speed, superimposition axis feed maximum speed, and superimposition axis real axis maximum speed and maximum speeds of the base axis and the superimposition axis when a command for the base axis is the fast feed is explained.

FIG. 10-2 is a diagram for explaining the calculation method for maximum speeds by the maximum-speed-by-operation-mode calculating unit 26. As shown in FIG. 10-2, when the command for the superimposition axis is the stop, the fast feed, or the cutting feed, the maximum-speed-by-operation-mode calculating unit 26 sets (maximum allowable speed of the C1 axis during the fast feed)×π/180× (maximum machining radius) as the superimposition axis synchronous maximum speed. When the command for the superimposition axis is the stop, the maximum-speed-by-operation-mode calculating unit 26 sets the superimposition axis feed maximum speed to zero. When the command for the superimposition axis is the fast feed, the maximum-speed-by-operation-mode calculating unit 26 sets smaller one of maximum allowable speed during the fast feed of the X2 axis and maximum allowable speed during the fast feed of the Y2 axis as the superimposition axis feed maximum speed. When the command for the superimposition axis is the cutting feed, the maximum-speed-by-operation-mode calculating unit 26 sets smaller one of maximum allowable speed during the cutting feed of the X2 axis and maximum allowable speed during the cutting feed of the Y2 axis as the superimposition axis feed maximum speed. When the command for the superimposition axis is the stop or the fast feed, the maximum-speed-by-operation-mode calculating unit 26 sets smaller one of maximum allowable speed during the fast feed of the X2 axis and maximum allowable speed during the fast feed of the Y2 axis as the superimposition axis real axis maximum speed. When the command for the superimposition is the cutting feed, the maximum-speed-by-operation-mode calculating unit 26 sets smaller one of maximum allowable speed during the cutting feed of the X2 axis and maximum allowable speed during the cutting feed of the Y2 axis as the superimposition axis real axis maximum speed.

The maximum-speed-by-operation-mode calculating unit 26 substitutes the calculated superimposition axis synchronous maximum speed, the calculated superimposition axis feed maximum speed, and the calculated superimposition axis real axis maximum speed in Formula 1 and calculates a clamp ratio Q. The maximum-speed-by-operation-mode calculating unit 26 sets a value obtained by multiplying the maximum allowable speed of the C1 axis during the fast feed by the clamp ratio Q as maximum speed of the base axis (base axis maximum speed during arc superimposition). When the command for the superimposition axis is the stop, the maximum-speed-by-operation-mode calculating unit 26 sets maximum speed of the superimposition axis (superimposition axis maximum speed during arc superimposition) to zero. When the command for the superimposition axis is the fast feed, the maximum-speed-by-operation-mode calculating unit 26 sets a value obtained by multiplying smaller one of the maximum allowable speed during the fast feed of the X2 axis and the maximum allowable speed during the fast feed of the Y2 axis with the clamp ratio Q as the superimposition axis maximum speed during arc superimposition. When the command for the superimposition axis is the cutting feed, the maximum-speed-by-operation-mode calculating unit 26 sets a value obtained by multiplying smaller one of the maximum allowable speed during the cutting feed of the X2 axis and the maximum allowable speed during the cutting feed of the Y2 axis with the clamp ratio Q as the superimposition axis maximum speed during arc superimposition.

As explained above, when the operation of the base axis is the fast feed, the maximum-speed-by-operation-mode calculating unit 26 calculates maximum speed of the base axis and that of the superimposition axis for each of the operations of the superimposition axis such that both of feeding speed of the base axis and feeding speed of the superimposition axis are equal to the maximum allowable speeds when both of the base axis and the superimposition axis are driven at the maximum speeds. Consequently, it is possible to set maximum speed of the feeding speed of the base axis and that of the feeding speed before superimposition of the superimposition axis such that the speeds of the base axis and the superimposition axis are made as high as possible in a range in which the speed of the superimposition axis does not exceed the maximum allowable speed.

A method of calculating, for each of commands for the superimposition axis, superimposition axis synchronous maximum speed, superimposition axis feed maximum speed, and superimposition axis real axis maximum speed and maximum speeds of the base axis and the superimposition axis when a command for the base axis is the cutting feed is explained.

As shown in FIG. 10-2, the maximum-speed-by-operation-mode calculating unit 26 sets (maximum allowable speed of the C1 axis during the cutting feed)×m/180× (maximum machining radius) as the superimposition axis synchronous maximum speed. The maximum-speed-by-operation-mode calculating unit 26 sets a minimum value of maximum allowable speeds during the fast feed and during the cutting feed of the X2 axis and the Y2 axis as superimposition axis feed maximum value and sets a value same as the superimposition axis feed maximum speed as superimposition axis real axis maximum speed.

The maximum-speed-by-operation-mode calculating unit 26 substitutes the calculated superimposition axis synchronous maximum speed, the calculated superimposition axis feed maximum speed, and the calculated superimposition axis real axis maximum speed in Formula 1 and calculates the clamp ratio Q. The maximum-speed-by-operation-mode calculating unit 26 sets a value obtained by multiplying the maximum allowable speed of the C1 axis during the cutting feed with the clamp ratio Q as base axis maximum speed during arc superimposition. When the command for the superimposition axis is the stop, the maximum-speed-by-operation-mode calculating unit 26 sets superimposition axis maximum speed during arc superimposition to zero. When the command for the superimposition axis is the fast feed, or the cutting feed, the maximum-speed-by-operation-mode calculating unit 26 sets a value obtained by multiplying a minimum value of the maximum allowable speeds during the fast feed and during the cutting feed of the X2 axis and the Y2 axis with the clamp ratio Q as the superimposition axis maximum speed during arc superimposition.

As explained above, when the operation of the base axis is the cutting feed, the maximum-speed-by-operation-mode calculating unit 26 calculates the maximum speeds of the base axis and the superimposition axis such that maximum speed of the second cutter holder 130 is a minimum value of maximum allowable speed related to the cutting feed and maximum allowable speed related to the fast feed irrespective of whether the operation of the second cutter holder 130 is the fast feed, the cutting feed, or the stop. Consequently, the maximum speed of the feed speed of the base axis is made a fixed value without depending on the operations (the stop, the fast feed, and the cutting feed) of the superimposition axis. Therefore, even if the operation on the superimposition axis side changes while machining is performed using the first cutter holder 120, it is possible to keep high machining quality of a machined surface by the first cutter holder 120.

FIG. 10-3 is a diagram for explaining a calculation result example of the maximum speeds calculated using the parameters shown in FIG. 10-1. As shown in FIG. 10-3, concerning the base axis and the superimposition axis, maximum speeds are calculated for each of the operation modes.

The arc-superimposition-interpolation-coordinate setting unit 27 sets vectors of the ordinate and the abscissa of the present position from the work center among coordinate conversion data in the coordinate conversion data stored in the coordinate-conversion-data-by-arc-superimposition-mode storage region 20.

The acceleration and deceleration processing unit 28 applies a predetermine arithmetic operation such as smoothing processing to the movement amount at every control cycle generated by the rough interpolation to thereby generate a movement amount taking into account acceleration and deceleration of the shafts. Specifically, the acceleration and deceleration processing unit 28 generates a movement amount to smoothly accelerate the shafts until the shafts reach feeding speed subjected to speed clamp and smoothly decelerate the shafts when the shafts are close to stop positions.

The arc-superimposition-interpolation control unit 29 rotates the work rotating shaft based on a command (a first command) described in the base axis program 210 and, at the same time, subjects the second cutter holder 130 to position control on a machining route obtained by superimposing the rotation of the work rotating shaft on a machining route (a first machining route) based on a command (a second command) described in the superimposition axis program 220.

Specifically, the arc-superimposition-interpolation control unit 29 includes a speed-fluctuation-following-system determining unit 30, a C-shaft-command-rotation-angle calculating unit 31, a C-shaft-FB-rotation-angle calculating unit 36, a spindle-command-rotation-angle calculating unit 37, a spindle-FB-rotation-angle calculating unit 38, a superimposition-coordinate-system-position-coordinate calculating unit 32, a real-coordinate converting unit 33, and a superimposition-axis-real-movement-amount calculating unit 34.

The speed-fluctuation-following-system determining unit 30 determines which following system is set among following systems for causing a position control operation of the superimposition axis to be generated to follow a commanded rotation angle of the C shaft of the base axis, causing the position control operation to a feedback (FB) rotation angle of the C shaft, causing the position control operation to follow a commanded rotation angle of the spindle, which is speed control, and causing the position control operation to follow a feedback rotation angle of the spindle. The speed-fluctuation-following-system determining unit 30 selects a functional unit used for calculation of a commanded rotation angle of the work rotating shaft among the C-shaft-command-rotation-angle calculating unit 31, the C-shaft-FB-rotation-angle calculating unit 36, the spindle-command-rotation-angle calculating unit 37, and the spindle-FB-rotation-angle calculating unit 38. There is a characteristic that, when the position control operation is caused to follow the commanded rotation angle, it is possible to drive the work rotating shaft faithfully to the commanded rotation angle and, when the position control operation is caused to follow the feedback rotation angle, it is possible to cope with a delay in a real angle due to machining load fluctuation.

Note that the setting of the following system is stored in the parameter storage region 9 in advance as a speed fluctuation following system parameter. The speed-fluctuation-following-system determining unit 30 performs determination of the following system based on the speed fluctuation following system parameter.

The C-shaft-command-rotation-angle calculating unit 31, the C-shaft-FB-rotation-angle calculating unit 36, the spindle-command-rotation-angle calculating unit 37, or the spindle-FB-rotation-angle calculating unit 38 calculates a commanded rotation angle or a feedback rotation angle of the work rotating shaft. Specifically, the C-shaft-command-rotation-angle calculating unit 31 calculates the commanded rotation angle using the C shaft, which is a position control driving shaft, as the base axis. Similarly, the spindle-command-rotation-angle calculating unit 37 calculates the commanded rotation angle from a speed command using the spindle, which is a speed control driving shaft, as the base axis. The C-shaft-FB-rotation-angle calculating unit 36 calculates the feedback rotation angle from position feedback data of a servo motor using the C shaft, which is the position control driving shaft, as the base axis. Similarly, the spindle-FB-rotation-angle calculating unit 38 calculates the feedback rotation angle from speed feedback data of the servo motor using the spindle, which is the speed control driving shaft, as the base axis.

The superimposition-coordinate-system-position-coordinate calculating unit 32 calculates positions of the shafts to be commanded next (hereinafter referred to as commanded position) based on an input movement amount at every control cycle and the present position. Note that, as an example, the superimposition-coordinate-system-position-coordinate calculating unit 32 calculates the present position by integrating the movement amount at every control cycle. That is, a position calculated at the last control cycle is used as the present position. The present position and the position to be calculated are located on a machining route before superimposition calculated based on a command described in the superimposition axis program 220 and are described by a relative coordinate before superimposition.

The real-coordinate converting unit 33 subjects the commanded position of the second cutter holder 130 calculated by the superimposition-coordinate-system-position-coordinate calculating unit 32 to coordinate rotation by the commanded rotation angle or the feedback rotation angle calculated by the functional unit selected by the speed-fluctuation-following-system determining unit 30 among the C-shaft-command-rotation-angle calculating unit 31, the C-shaft-FB-rotation-angle calculating unit 36, the spindle-command-rotation-angle calculating unit 37, and the spindle-FB-rotation-angle calculating unit 38 to thereby calculate a commanded position after superimposition of the second cutter holder 130. Note that the real-coordinate converting unit 33 converts the commanded position of the base axis and the commanded position after superimposition of the superimposition axis from a program coordinate system used in the machining program 200 into a machine coordinate system using identification information of the shafts described in the coordinate conversion data.

The superimposition-axis-real-movement-amount calculating unit 34 calculates, based on the commanded positions of the shafts calculated by the real-coordinate converting unit 33 and the present positions of the shafts, real movement amounts commanded to the servo control units 4a to 4f. Note that, as the present positions, position information input from the servo motors 5a to 5f via the servo control units 4*a* to 4*f* can be used or an integrated value of the calculated real movement amounts can be used.

The shaft-data input and output unit 35 outputs, to the servo control units (4*a* to 4*f*) for the shafts, the real movement amounts for moving the X axis, the Y axis, and the other control axes of the second cutter holder 130, which is the superimposition axis, output from the superimposition-axis-real-movement-amount calculating unit 34. The shaft-data input and output unit 35 acquires position information and the like of the shaft servo motors (5*a* to 5*f*) as feedback (FB) data through the shaft-servo control units (4*a* to 4*f*) and outputs the position information and the like to the arc-superimposition-interpolation control unit 29.

The operation of the NC device 300 in the embodiment of the present invention is explained with reference to FIG. 11 to FIG. 14.

Figure 11:
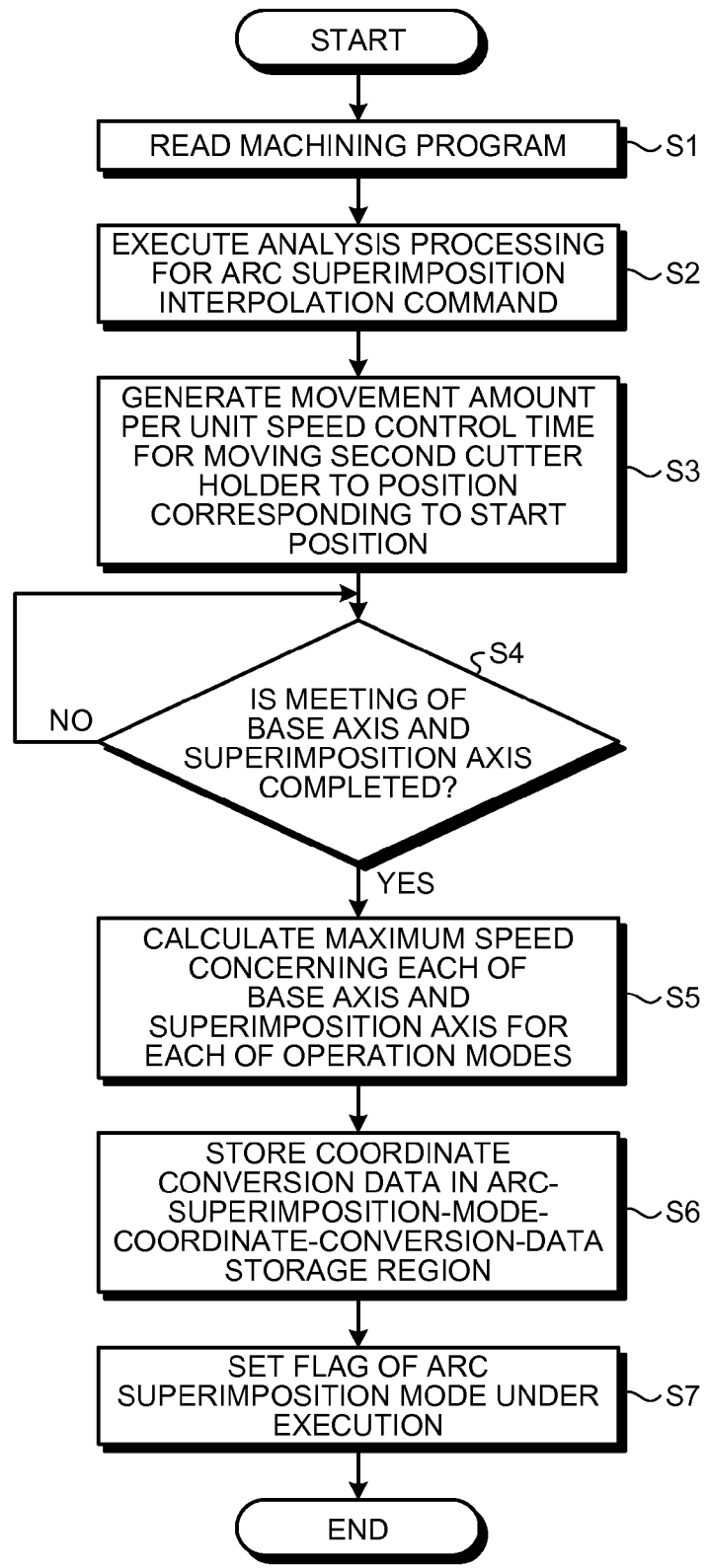
FIG. 11 is a flowchart for explaining the operation of the NC device in shifting to an arc superimposition correction mode.

FIG. 11 is a flowchart for explaining the operation of the NC device 300 in shifting to an arc superimposition correction mode. First, the analysis processing unit 17 reads a machining program (step S1). When the analysis processing unit 17 detects an arc superimposition interpolation command, the arc-superimposition-interpolation-command analyzing unit 18 executes analysis processing for the detected arc superimposition interpolation command (step S2). The arc-superimposition-interpolation-command analyzing unit 18 extracts a description related to a start position and definition information of the base axis and the superimposition axis according to the analysis processing. The arc-superimposition-interpolation-command analyzing unit 18 stores the extracted contents in the coordinate-conversion-data-by-arc-superimposition-mode storage region 20 as coordinate conversion data.

The arc-superimposition-interpolation-start-position moving unit 23 generates a movement amount at every control cycle for moving the tool of the second cutter holder 130, which is the superimposition axis, from the present position (the standby position) to a position corresponding to the start position (step S3). The movement amount is transmitted to the servo control units 4*d* and 4*f* via the acceleration and deceleration processing unit 28, the arc-superimposition-interpolation control unit 29, and the shaft-data input and output unit 35. As a result, the position (the X2 axis and the Y2 axis) of the second cutter holder 130 moves to the position corresponding to the start position as explained with reference to FIG. 8.

Subsequently, the arc-superimposition-interpolation-start determining unit 25 determines whether meeting of the base axis and the superimposition axis is completed (step S4). The completion of the meeting means that, as explained above, the second cutter holder 130 reaches the position corresponding to the start position and a designated angle in the work rotating shaft coincides with an angle of a vector from the rotation center of the work 140 to the position corresponding to the start position. When the meeting is completed (No at step S4), the arc-superimposition-interpolation-start determining unit 25 executes the determination processing at step S4 again. When the meeting is completed (Yes at step S4), the maximum-speed-by-operation-mode calculating unit 26 calculates maximum speed concerning each of the base axis and the superimposition axis for each of the operation modes and stores a calculation result in the maximum-speed-data-by-arc-superimposition-mode storage region 19 (step S5).

Figure 12:
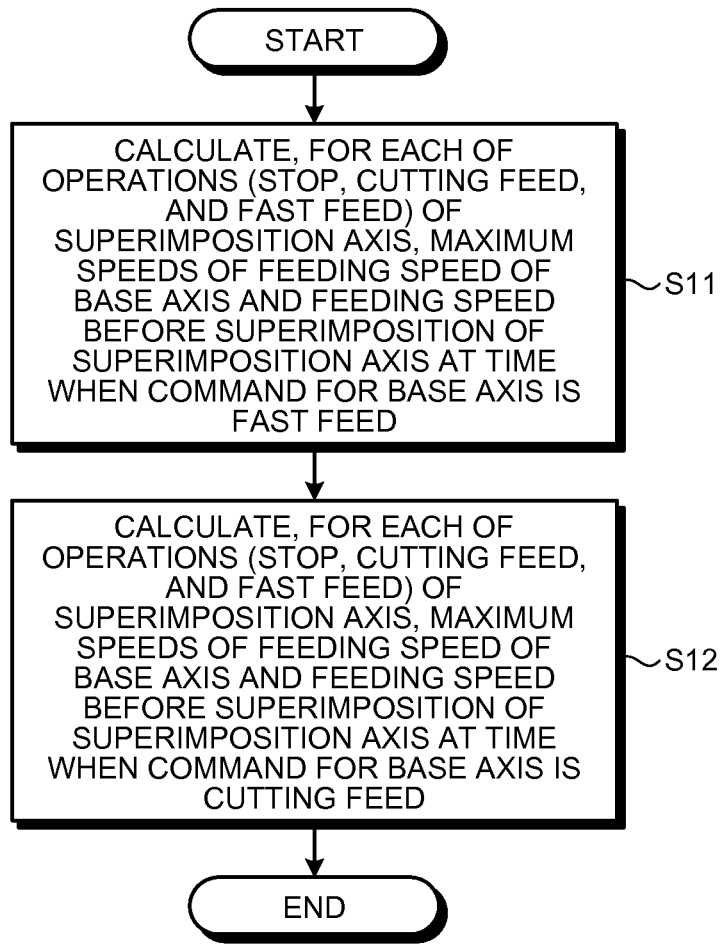
FIG. 12 is a flowchart for explaining processing at step S5 more in detail.

FIG. 12 is a flowchart for explaining the processing at step S5 more in detail. As shown in the figure, first, the maximum-speed-by-operation-mode calculating unit 26 calculates, based on the calculation method explained with reference to FIG. 10-2, maximum values of the feeding speed of the base axis and the feeding speed before superimposition of the superimposition axis at the time when the command for the base axis is the fast feed (step S11). At step S11, the respective maximum speeds are calculated for each of the commands (the stop, the cutting feed, and the fast feed) for the superimposition axis. The calculated maximum speeds are stored in the maximum-speed-data-by-arc-superimposition-mode storage region 19.

Subsequently, the maximum-speed-by-operation-mode calculating unit 26 calculates maximum speeds of the feeding speed of the base axis and the feeding speed before superimposition of the superimposition axis at the time when the command for the base axis is the cutting feed (step S12). At step S12, as at step S11, the respective maximum speeds are calculated for each of the commands (the stop, the cutting feed, and the fast feed) for the superimposition axis. The calculated maximum speeds are stored in the maximum-speed-data-by-arc-superimposition-mode storage region 19.

After the processing at step S5, the arc-superimposition-interpolation-coordinate setting unit 27 stores the coordinate conversion data in the coordinate-conversion-data-by-arc-superimposition-mode storage region 20 (step S6). Specifically, the arc-superimposition-interpolation-coordinate setting unit 27 calculates vectors of the ordinate and the abscissa of the present position of the superimposition axis from the rotation center of the work 140. The arc-superimposition-interpolation-coordinate setting unit 27 stores the calculated vectors in the coordinate-conversion-data-by-arc-superimposition-mode storage region 20 of the storing unit 8. The arc-superimposition-interpolation-coordinate setting unit 27 reads out shaft information (shaft number information, polarity information) of the base axis and the superimposition axis from the parameters of the storing unit 8, converts the shaft information, and stores the shaft information in the coordinate-conversion-data-by-arc-superimposition-mode storage region 20 of the storing unit 8.

Various data for calculation and execution of the arc superimposition interpolation are collected by the processing explained above. Therefore, the arc-superimposition-interpolation-coordinate setting unit 27 sets a flag of arc superimposition mode under execution (step S7), and the arc superimposition mode is established. Note that the flag of arc superimposition mode under execution is stored in, for example, the shared region 14.

Figure 13:
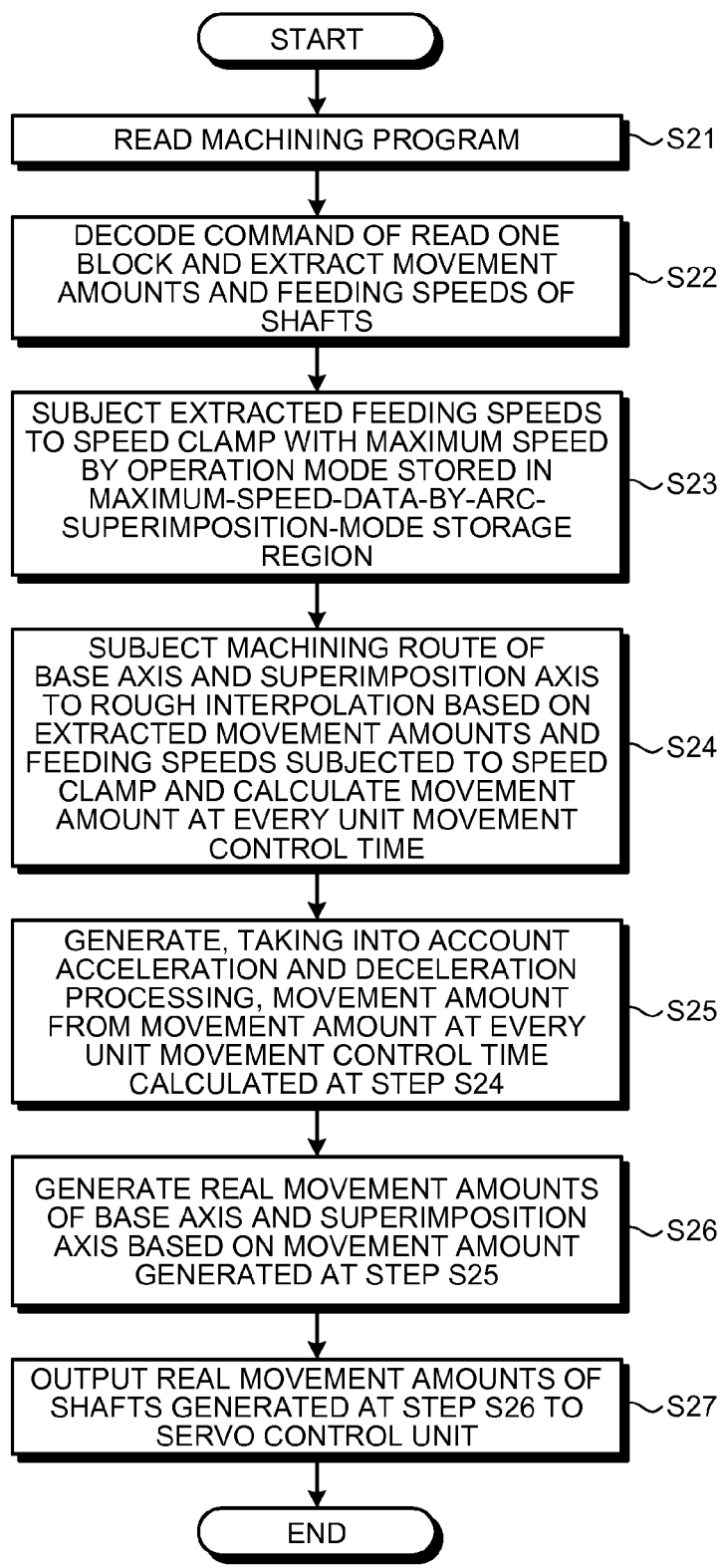
FIG. 13 is a flowchart for explaining the operation of the NC device after a shift to an arc superimposition mode.

FIG. 13 is a flowchart for explaining the operation of the NC device 300 after the shift to the arc superimposition mode.

First, the analysis processing unit 17 reads a machining program (step S21), decodes a command of read one block, and extracts movement amounts and feeding speeds of the shafts (step S22).

Subsequently, the arc-superimposition-interpolation-speed-clamp processing unit 21 subjects the feeding speeds extracted at step S22 to speed clamp with the maximum speed for each operation mode stored in the maximum-speed-data-by-arc-superimposition-mode storage region 19 (step S23). Note that a method of specifying with the maximum speed related to which operation mode the feeding speeds are clamped is not specifically limited. For example, the analysis processing unit 17 can record the operation (the stop, the cutting feed, or the fast feed) currently being executed by the base axis and the superimposition axis in the shared region 14. The arc-superimposition-interpolation-speed-clamp processing unit 21 can determine, based on the operation of the shafts recorded in the shared region 14, the maximum speed of which operation mode is used.

Subsequently, the interpolation processing unit 22 subjects machining routes of the base axis and the superimposition axis to rough interpolation based on the movement amounts extracted at step S22 and the feeding speeds subjected to the speed clamp at step S23 and calculates movement amounts at every unit control cycle (step S24).

The acceleration and deceleration processing unit 28 generates, from the movement amounts at every unit control cycle calculated by the processing at step S24, movement amounts taking into account acceleration and deceleration processing (step S25).

The arc-superimposition-interpolation control unit 29 generates real movement amounts of the base axis and the superimposition axis based on the movement amounts generated at step S25 (step S26).

Figure 14:
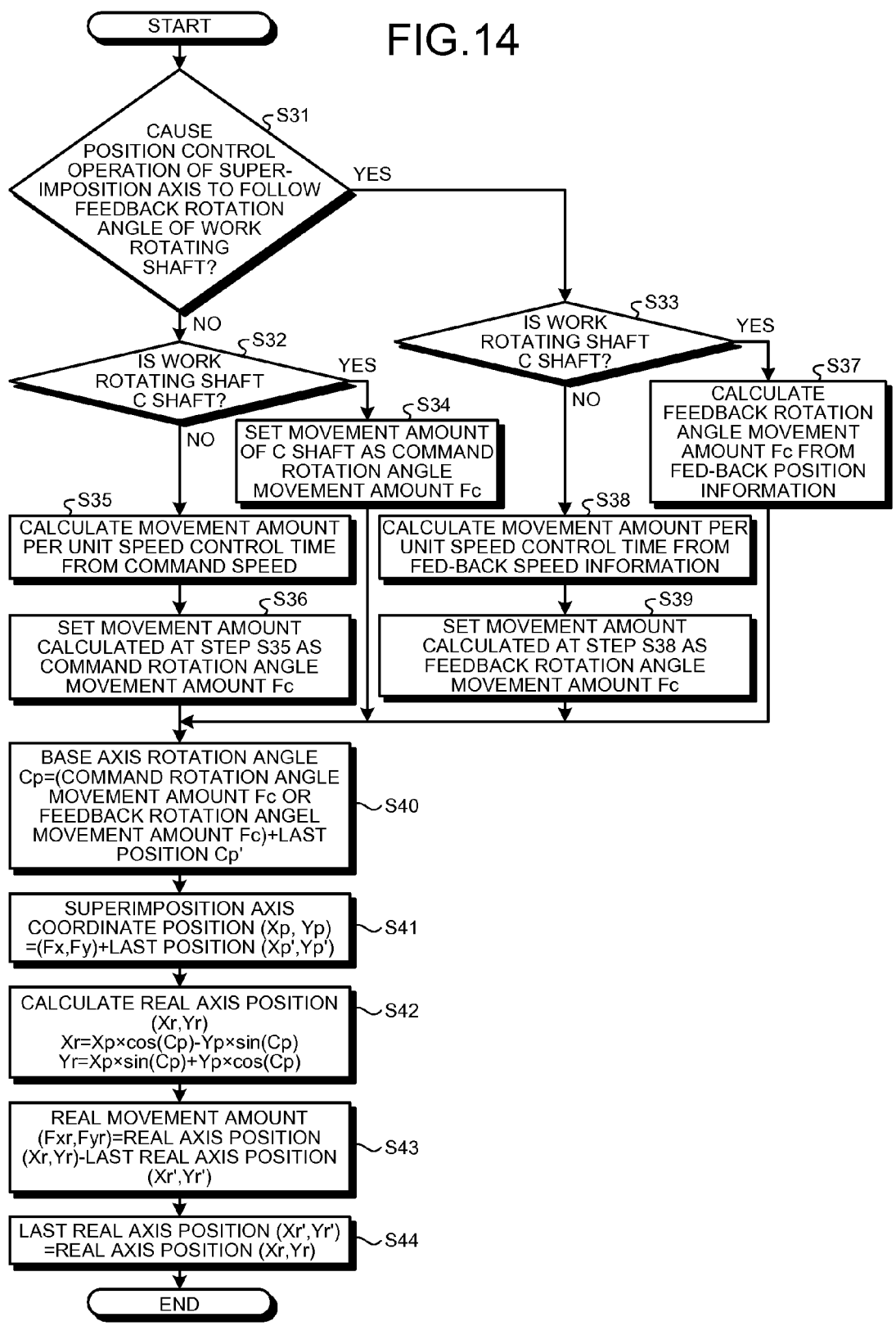
FIG. 14 is a flowchart for explaining processing at step S26 more in detail.

FIG. 14 is a flowchart for explaining the processing at step S26 more in detail. Control of the basic axis by the work rotating shaft, the X1 axis, and the Z1 axis is basic control content. Therefore, explanation of the control is omitted below. A technology for controlling the superimposition axis in synchronization with the rotation of the work rotating shaft is explained.

First, the speed-fluctuation-following-system determining unit 30 determines whether a position control operation for the superimposition axis is caused to follow a feedback rotation angle of the work rotating shaft or caused to follow commanded rotating speed (step S31) and whether the work rotating shaft is the C shaft or the spindle (step S32 and step S33). The determination processing is performed by checking a speed fluctuation following mode flag set in the parameter storage region 9 or the like. For example, when the flat indicates "0", the flag indicates setting for causing the position control operation to follow the commanded rotation angle. When the flag indicates "1", the flag indicates setting for causing the position control operation to follow the feedback rotation angle.

When the setting for causing the position control operation for the superimposition axis to follow the commanded rotation angle of the C shaft is made (No at step S31 and Yes at step S32), the C-shaft-command-rotation-angle calculating unit 31 sets a movement amount of the C shafts among input movement amounts as a commanded rotation angle movement amount Fc (step S34).

When the setting for causing the position control operation for the superimposition axis to follow the commanded rotation angle of the spindle is made (No at step S31 and No at step S32), the spindle-command-rotation-angle calculating unit 37 calculates a movement amount at every control cycle from the commanded rotating speed extracted by the analysis processing unit 17 (step S35) and sets the calculated movement amount as the commanded rotation angle movement amount Fc (step S36).

When the setting for causing the position control operation for the superimposition axis to follow the feedback rotation angle of the C shaft is made (Yes at step S31 and Yes at step S33), the C-shaft-FB-rotation-angle calculating unit 36 calculates a feedback rotation angle movement angle Fc from position information fed back at every predetermined time from the spindle/C1 axis motor 5c via the spindle/C1 axis servo control unit 4c (step S37).

When the setting for causing the position control operation for the superimposition axis to follow the feedback rotation angle of the spindle is made (Yes at step S31 and No at step S33), the spindle-FB-rotation-angle calculating unit 38 calculates a movement amount at every control cycle by integrating speed feedback data with a unit speed control time (step S38). The spindle-FB-rotation-angle calculating unit 38 sets the calculated movement amount as the feedback rotation angle movement amount Fc (step S39).

After the processing at step S34, step S36, step S37, or step S39, the C-shaft-command-rotation-angle calculating unit 31, the C-shaft-FB-rotation-angle calculating unit 36, the spindle-command-rotation-angle calculating unit 37, or the spindle-FB-rotation-angle calculating unit 38 adds the commanded rotation angle movement amount Fc or the feedback rotation angle movement amount Fc of the work rotating shaft to the last position (rotation angle) Cp' and calculates a new base axis rotation angle Cp (step S40).

The superimposition-coordinate-system-position-coordinate calculating unit 32 adds movement amounts Fx and Fy related to the X2 axis and the Y2 axis of the superimposition axis calculated by the acceleration and deceleration processing unit 28 to the last positions Xp' and Yp' and sets values calculated by the addition as superimposition axis coordinate positions Xp and Yp (step S41).

The real-coordinate converting unit 33 subjects the superimposition axis coordinate positions Xp and Yp to coordinate rotation at the base axis rotation angle Cp, converts position information after the coordinate rotation into a machine coordinate system based on coordinate conversion data, and calculates real axis positions Xr and Yr on an X2-Y2 plane coordinate (step S42). The coordinate rotation is executed using Formula 2 and Formula 3 shown below.

$$Xr = Xp \times \cos(Cp) - Yp \times \sin(Cp) \quad \text{Formula 2}$$

$$Yr = Xp \times \sin(Cp) - Yp \times \cos(Cp) \quad \text{Formula 3}$$

The superimposition-axis-real-movement-amount calculating unit 34 subtracts the real axis positions Xr' and Yr' calculated last time from the calculated real axis positions Xr and Yr to thereby calculate a real movement amount of the superimposition axis (step S43). The superimposition-axis-real-movement-amount calculating unit 34 updates the real axis positions Xr' and Yr' with the real axis positions Xr and Yr (step S44)and the processing at step S26 ends. Note that a recording destination of the real movement amounts Xr' and Yr' is not specifically limited. For example, the real movement amounts Xr' and Yr' can be recorded in, for example, the shared region 14.

After the processing at step S26, the shaft-data input and output unit 35 outputs the calculated actual movement amounts of the shafts to the servo control units 4a to 4f (step S27) and the operation ends.

As explained above, according to the embodiment of the present invention, the NC device 300 includes the arc-superimposition-interpolation control unit 29 configured to rotate the work rotating shaft based on the command of the base axis program 210 for controlling the rotation of the work rotating shaft while performing the front surface machining using the first cutter holder 120 and, at the same time, subject the second cutter holder 130 to position control on the second machining route obtained by superimposing the rotation of the work rotating shaft on the first machining route on the relative coordinate based on the command of the superimposition axis program 220 described using the relative coordinate to the work 140 and for performing the position control for the second cutter holder 130. Therefore, it is possible to execute machining for the front surface while rotating the work and, at the same time, apply machining to an eccentric position on the end face.

When the arc superimposition interpolation is performed, if the work rotating shaft is moved at the maximum allowable speed of the work rotating shaft to drive the superimposition axis, it is likely that a problem occurs in that the speed of the superimposition axis exceeds the maximum allowable speed, the tool is broken, and machining cannot be performed because of cutting torque insufficiency. According to the embodiment of the present invention, the NC device 300 further includes the maximum-speed-by-operation-mode calculating unit 26 configured to calculate maximum speed of the work rotating shaft such that the speed after superimposition of the second cutter holder 130 does not exceed the maximum allowable speed set in advance and the arc-superimposition-interpolation-speed-clamp processing unit 21 configured to clamp the rotating speed of the work rotating shaft with the maximum speed calculated by the maximum-speed-by-operation-mode calculating unit 26. Therefore, it is possible to suppress the occurrence of the problem.

The maximum-speed-by-operation-mode calculating unit 26 is configured to set maximum speed of the work rotating shaft at the time when both of the operation of the first cutter holder 120 and the operation of the second cutter holder 130 are the fast feed as the speed of the work rotating shaft at which the maximum speed of the second cutter holder 130 coincides with the maximum allowable speed related to the fast feed and set maximum speed of the work rotating shaft at the time when the operation of the first cutter holder 120 is the fast feed and the operation of the second cutter holder 130 is the cutting feed or the stop as the speed of the work rotating shaft at which the maximum speed of the second cutter holder 130 coincides with the maximum allowable speed related to the cutting feed. Therefore, when the base axis executes the fast feed, it is possible to increase the speeds of the base axis and the superimposition axis as much as possible.

Note that, in the above explanation, the maximum speeds in the respective cases are explained as being set as the speed of the work rotating shaft at which the maximum speed of the second cutter holder 130 coincides with the maximum allowable speed related to the fast feed or the cutting feed. However, the maximum speeds in the respective cases can be set to the speed of the work rotating shaft at which the maximum speed of the second cutter holder 130 coincides with speed determined with the maximum allowable speed related to the fast feed or the cutting feed being set as an upper limit. For example, the maximum speeds in the respective cases can be set to the speed of the work rotating shaft at which the maximum speed of the second cutter holder 130 coincides with speed obtained by subtracting a predetermined offset from the maximum allowable speed related to the fast feed or the cutting feed.

The maximum-speed-by-operation-mode calculating unit 26 is configured to set the maximum speed of the work rotating shaft at the time when the operation of the first cutter holder 120 is the cutting feed as the speed of the work rotating shaft at which the maximum speed of the second cutter holder 130 coincides with a minimum value among respective maximum allowable speeds irrespective of whether the operation of the second cutter holder 130 is the fast feed, the cutting feed, or the stop. Therefore, the speed of the work rotating shaft is fixed irrespective of the operation of the superimposition axis. Therefore, it is possible to perform machining without deteriorating the quality of the machined surface by the first cutter holder 120 even if the operation of the superimposition axis changes while the machining is performed using the first cutter holder 120.

The arc superimposition interpolation command includes the descriptions of the position of the second cutter holder 130 and the position of the work rotating shaft. The NC device 300 further includes the arc-superimposition-interpolation-start determining unit 25 configured to determine whether both the positions described in the arc superimposition interpolation command coincide with each other and, after both the positions coincide with each other, permit the start of the arc superimposition interpolation. Therefore, it is possible to determine a correspondence relation between the coordinate system used in the superimposition axis program 220 and the coordinate system used in the base axis program 210 according to the arc superimposition interpolation command. Therefore, it is possible to apply desired machining to a desired position on the end face of the work 140.

The NC device 300 further includes the relative-coordinate-speed calculating unit (the interpolation processing unit 22 and the acceleration and deceleration processing unit 28) configured to calculate, based on the superimposition axis program 220, a movement amount at every control cycle in the coordinate system before superimposition. The arc-superimposition-interpolation control unit 29 includes the superimposition-coordinate-system-position-coordinate calculating unit 32 configured to integrate the movement amount at every control cycle in the coordinate system before superimposition and calculate a commanded position of the second cutter holder 130 on the first machining route, the rotation-angel calculating unit (the C-shaft-command-rotation-angle calculating unit 31, the C-shaft-FB-rotation-angle calculating unit 36, the spindle-command-rotation-angle calculating unit 37, and the spindle-FB-rotation-angle calculating unit 38) configured to calculate a rotation angle of the work rotating shaft, and the real-coordinate converting unit 33 configured to subject the commanded position of the second cutter holder 130 to coordinate rotation by the rotation angle of the work rotating shaft to calculate a commanded position on the second machining route.

The rotation-angle calculating unit (the C-shaft-FB-rotation-angle calculating unit 36 and the spindle-FB-rotation-angle calculating unit 38) is configured to calculate a rotation angle of the work rotating shaft based on feedback information from the motors 5a to 5f. Therefore, it is possible to eliminate a delay in a commanded position or speed of the work rotating shaft and, even if the position of the work rotating shaft fluctuates with a machining reaction or the like during machining, cause the operation of the second cutter holder 130 to follow the fluctuation. Therefore, it is possible to perform more highly accurate machining.

INDUSTRIAL APPLICABILITY

As explained above, the numerical control device according to the present invention is suitably applied to a numerical control device that controls a machine tool for performing turning such as a lathe.

REFERENCE SIGNS LIST

1 Control arithmetic unit
2 Input operation unit
3 Display unit
4a to 4f Servo control units
5a to 5f Servo motors
6 Input control unit
7 Data setting unit
8 Storing unit 9 Parameter storage region
10 Tool-correction-data storage region
11 Machining-program storage region
12 Machine-control-signal processing unit
13 PLC
14 Shared region
15 Screen-display-data storage region
16 Screen processing unit
17 Analysis processing unit
18 Arc-superimposition-interpolation-command analyzing unit
19 Maximum-speed-data-by-arc-superimposition-mode storage region
20 Coordinate-conversion-data-by-arc-superimposition-mode storage region
21 Arc-superimposition-interpolation-speed-clamp processing unit
22 Interpolation processing unit
23 Arc-superimposition-interpolation-start-position moving unit
24 Arc-superimposition-interpolation-start processing unit
25 Arc-superimposition-interpolation-start determining unit
26 Maximum-speed-by-operation-mode calculating unit
27 Arc-superimposition-interpolation-coordinate setting unit
28 Acceleration and deceleration processing unit
29 Arc-superimposition-interpolation control unit
30 Speed-fluctuation-following-system determining unit
31 C-shaft-command-rotation-angle calculating unit
32 Superimposition-coordinate-system-position-coordinate calculating unit
33 Real-coordinate converting unit
34 Superimposition-axis-real-movement-amount calculating unit
35 Shaft-data input and output unit
36 C-shaft-FB-rotation-angle calculating unit
37 Spindle-command-rotation-angle calculating unit
38 Spindle-FB-rotation-angle calculating unit
100 Lathe
110 Work holding tool
120 First cutter holder
130 Second cutter holder
140 Work
200 Machining program
210 Base axis program
220 Superimposition axis program
300 NC device

The invention claimed is:

1. A numerical control device that controls a machine tool including: a work rotating shaft configured to rotate a work; a first cutter holder configured to machine a front surface of the work when the work is rotating; and a second cutter holder configured to be capable of moving on a surface having an axis direction of the work rotating shaft as a normal and machine the work from a side opposed to an end face of the work, the numerical control device comprising:
a machining-program storage region having stored therein a machining program including a first command for controlling the rotation of the work rotating shaft while performing front surface machining using the first cutter holder and a second command described using a relative coordinate with respect to the work and for performing position control on the second cutter holder;
an arc-superimposition-interpolation control unit configured to rotate the work rotating shaft in accordance with the first command and, at the same time, subject the second cutter holder to the position control on a second machining route obtained by superimposing the rotation of the work rotating shaft on a first machining route in accordance with the second command,
a maximum-speed calculating unit configured to calculate a maximum speed of the work rotating shaft such that speed of the second cutter holder moving on the second machining route does not exceed a maximum allowable speed set in advance; and
a speed clamp unit configured to clamp rotating speed of the work rotating shaft with the maximum speed calculated by the maximum-speed calculating unit.

2. The numerical control device according to claim 1, wherein
the maximum allowable speed of the second cutter holder is set in advance concerning each of fast feed and cutting feed, and
the maximum-speed calculating unit sets maximum speed of the work rotating shaft at the time when both an operation of the first cutter holder and an operation of the second cutter holder are the fast feed as the speed of the work rotating shaft at which the maximum speed of the second cutter holder moving on the second machining route coincides with a speed that is set with the maximum allowable speed related to the fast feed being set as an upper limit, and sets the maximum speed of the work rotating shaft at the time when the operation of the first cutter holder is the fast feed, and the operation of the second cutter holder is the cutting feed or stop as the speed of the work rotating shaft at which the maximum speed of the second cutter holder moving on the second machining route coincides with a speed that is set with the maximum allowable speed related to the cutting feed being set as an upper limit.

3. The numerical control device according to claim 1, wherein
the maximum allowable speed of the second cutter holder is set in advance concerning each of fast feed and cutting feed, and
the maximum-speed calculating unit sets, irrespective of whether an operation of the second cutter holder is the fast feed, cutting feed, or stop, the maximum speed of the work rotating shaft at the time when an operation of the first cutter holder is the cutting feed as a speed of the work rotating shaft at which the maximum speed of the second cutter holder moving on the second machining route coincides with a speed that is set with a minimum value among the respective maximum allowable speeds being set as an upper limit.

4. The numerical control device according to claim 1, wherein
the machining program includes a third command for designating a first position in the relative coordinate of the second cutter holder and a second position of the work rotating shaft, and
the numerical control device further comprises an arc-superimposition-interpolation-start determining unit configured to determine whether the first position of the second cutter holder and the second position of the work rotating shaft coincide with each other and, when both the positions coincide with each other, permit the arc-superimposition-interpolation control unit to start control related to the first command and position control related to the second command.

5. The numerical control device according to claim 1, further comprising a relative-coordinate-speed calculating unit configured to calculate, in accordance with the second command, a movement amount at every control cycle in the relative coordinate, wherein the arc-superimposition-interpolation control unit further includes:

a superimposition-coordinate-system-position-coordinate calculating unit configured to integrate the movement amount at every control cycle in the relative coordinate and calculate a commanded position of the second cutter holder on the first machining route;

a rotation-angle calculating unit configured to calculate a rotation angle of the work rotating shaft; and a real-coordinate converting unit configured to subject the commanded position of the second cutter holder to coordinate rotation by the rotation angle of the work rotating shaft and calculate a commanded position on the second machining route.

6. The numerical control device according to claim 5, wherein the work rotating shaft outputs a position or speed as feedback information, and the rotation-angle calculating unit calculates a rotation angle of the work rotating shaft on the basis of the feedback information.

\* \* \* \* \*